US005935890A

United States Patent [19]

McLaughlin et al.

[11] Patent Number: 5,935,890
[45] Date of Patent: *Aug. 10, 1999

[54] STABLE DISPERSIONS OF METAL PASSIVATION AGENTS AND METHODS FOR MAKING THEM

[75] Inventors: John McLaughlin, Media, Pa.; Philip S. Podwirny, Haddonfield, N.J.; John C. Morley, Devon, Pa.

[73] Assignee: GLCC Technologies, Inc., W. Lafayette, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,108

[22] Filed: Aug. 1, 1996

[51] Int. Cl.$^6$ ............................. B01J 20/34; B01J 38/52; B01J 38/56

[52] U.S. Cl. ................................. 502/22; 502/29; 502/31; 502/33

[58] Field of Search ................................. 502/20, 22, 29, 502/31, 33

[56] References Cited

U.S. PATENT DOCUMENTS

| | | | |
|---|---|---|---|
| 2,621,859 | 12/1952 | Phillips | 241/47 |
| 2,678,168 | 5/1954 | Phillips | 241/47 |
| 3,090,567 | 5/1963 | Schafer | 241/22 |
| 3,405,874 | 10/1968 | Brizon | 241/174 |
| 3,540,663 | 11/1970 | Dietz | 241/22 |
| 3,624,043 | 11/1971 | Siclari et al. | 260/75 |
| 3,651,158 | 3/1972 | Tabler | 260/667 |
| 3,676,362 | 7/1972 | Yates | 252/309 |
| 3,677,476 | 7/1972 | Harned | 241/5 |
| 3,677,933 | 7/1972 | Johnson et al. | 208/109 |
| 3,711,422 | 1/1973 | Johnson et al. | 252/414 |
| 3,759,500 | 9/1973 | Nerozzi | 266/9 |
| 3,816,080 | 6/1974 | Bomford et al. | 29/182.5 |
| 3,947,277 | 3/1976 | Carnahan et al. | 106/26 |
| 3,951,894 | 4/1976 | Whelan, Jr. | 260/27 BB |
| 3,969,570 | 7/1976 | Smith | 428/336 |
| 3,995,817 | 12/1976 | Brociner | 241/30 |
| 4,025,458 | 5/1977 | McKay | 252/416 |
| 4,065,544 | 12/1977 | Hamling et al. | 423/252 |
| 4,075,032 | 2/1978 | Thomas | 106/303 |

(List continued on next page.)

FOREIGN PATENT DOCUMENTS

| | | |
|---|---|---|
| 0 260 580 B1 | 3/1988 | European Pat. Off. ........ C10G 11/05 |
| 55-104658 | 8/1980 | Japan . |
| 1507443 A2 | 9/1989 | U.S.S.R. . |
| 1366104 | 9/1974 | United Kingdom . |
| 1371588 | 10/1974 | United Kingdom . |

OTHER PUBLICATIONS

J. McLaughlin, Interoffice Memorandum, Antimony Oxide for Metal Passivation, (non–public document), pp. 1–3, May 8, 1996.
J. McLaughlin, Confidential Disclosure Statement, pp. 1–2, (1994), no month.
Best Sb2O3 run to date, Jun. 1994.
Report #19258, Nov. 1994.
J.R. McLaughlin, "Cookson Specialty Additives Know–How Transfer Document Colloidal Flame Retardants $Sb_2O_3$ and Halogen Compounds," Jul. 25, 1994.
"Best $Sb_2O_3$ run to date", Jun. 1994, 5 pages.
"Netzsch Laboratory Test Data Sheets", Feb. 18, 1994 and Apr. 18, 1994.
"Report #19258", Nov. 29, 1994, 8 pages.
"Comparison of YTZ and Fused Zircon Media"; Peter J. Donnelly (TOSOH Corp.) and Hiroshi Ohnishi (Nikkato); "Powder and Bulk Engineering"; Jun. 1994.
"Sand Grinder and Szegvari Attritor"; "Paint Flow and Pigment Dispersion; A Rheological Approach to Paint and Ink"; Temple C. Patton; pp. 290–302; John Wiley and Son; 2nd Ed., Apr. 1979.
"YTZ Grinding Media", Technical Bulletin, Tosoh Corporation; Apr. 20, 1993.
"YTZ Ceramic Ball; High Wear–resistant Zirconia Grinding Media"; Tosoh Corporation Technical Bulletin; Apr. 1991.
"Netzsch Grinding and Dispersion Equipment"; Netzsch, Inc.—Product Bulletin.
"Alpine Mechanical Processing Technology—Fluidized Bed Opposed J. Mills AFG Type 100–1250"; Alpine AG–Hosakowa Micron Group Alpine Aktungesellschaft Leaflet 21/1e; Jun. 1984.
"Catalog TH980; Tri–homo colloid mills"; Sonic Corp.; Mar. 1975.
"Micron Powder Systems; Acucut™ Ultrafine Air Classifiers"; Micron Powder Systems, Summit, New Jersey no date.
"Ceramic Milling in Netzsch small media mills"; H. Way; Netzsch, Inc.; "Ceramic Processing Magazine"; Jun. 1994.
"Particle Size Reduction of Ceramic Powders Using a Small Media Mill; Controlling factors in milling"; Subhas Malghan–National Standards, no date.
"Scaling Up Mills From Laboratory Size Equipment To Production Equipment"; H. Way; Netzsch Inc.; 1988, no month.
"Horizontal Milling Variables"; H. Way; Apr. 1993.

Primary Examiner—Michael Lewis
Assistant Examiner—Alexander G. Ghyka
Attorney, Agent, or Firm—Kenyon & Kenyon

[57] ABSTRACT

A process for passivating contaminating metal on a hydrocarbon cracking catalyst is provided. The catalyst is contacted within a hydrocarbon catalytic cracking unit with a stabilized dispersion. The dispersion comprises a fluid vehicle, a dispersion agent, and finely milled particles of one or more metals or metal compounds for passivation of metal-contaminated cracking catalysts. The dispersion is preferably produced by a process wherein an agitated media mill is loaded with comminuting media, fluid vehicle, dispersion agent and particles of a metal or metal compound for passivation of metal-contaminated cracking catalysts. The comminuting media, fluid vehicle, and particles are then agitated until the particles are reduced in size by at least 10% and have a volumetric average particle size of less than 0.5 microns.

23 Claims, No Drawings

U.S. PATENT DOCUMENTS

| | | | |
|---|---|---|---|
| 4,120,798 | 10/1978 | Mischutin | 252/8.1 |
| 4,141,858 | 2/1979 | McKay | 252/439 |
| 4,148,714 | 4/1979 | Nielsen et al. | 208/114 |
| 4,166,806 | 9/1979 | McKay et al. | 252/437 |
| 4,178,276 | 12/1979 | Shue et al. | 260/37 R |
| 4,190,552 | 2/1980 | Bertus et al. | 252/411 R |
| 4,192,664 | 3/1980 | Joshi | 65/22 |
| 4,193,891 | 3/1980 | McKay | 252/411 R |
| 4,198,317 | 4/1980 | Bertus et al. | 252/411 R |
| 4,198,320 | 4/1980 | Chester et al. | 252/455 Z |
| 4,208,302 | 6/1980 | McKay | 252/411 R |
| 4,209,453 | 6/1980 | Bertus et al. | 260/446 |
| 4,218,337 | 8/1980 | McKay | 252/411 R |
| 4,230,462 | 10/1980 | Moskowitz | 51/307 |
| 4,238,362 | 12/1980 | Bertus et al. | 252/439 |
| 4,238,367 | 12/1980 | Bertus et al. | 252/455 Z |
| 4,255,287 | 3/1981 | Bertus et al. | 252/455 Z |
| 4,256,564 | 3/1981 | Roberts et al. | 208/120 |
| 4,257,876 | 3/1981 | McKay | 208/120 |
| 4,283,274 | 8/1981 | McKay et al. | 208/120 |
| 4,290,919 | 9/1981 | McKay et al. | 252/437 |
| 4,326,990 | 4/1982 | Mark et al. | 252/431 C |
| 4,332,354 | 6/1982 | deMonterey et al. | 241/16 |
| 4,348,273 | 9/1982 | Nielsen | 208/113 |
| 4,363,720 | 12/1982 | Hirschberg et al. | 208/120 |
| 4,364,847 | 12/1982 | Tu | 252/412 |
| 4,367,164 | 1/1983 | Shiroto et al. | 252/457 |
| 4,367,165 | 1/1983 | Asaoka et al. | 252/457 |
| 4,377,494 | 3/1983 | Bertus et al. | 252/411 R |
| 4,397,767 | 8/1983 | Roberts et al. | 252/431 P |
| 4,404,023 | 9/1983 | Glück | 75/0.5 R |
| 4,439,536 | 3/1984 | Bertus et al. | 502/64 |
| 4,447,552 | 5/1984 | Hayes et al. | 502/41 |
| 4,454,025 | 6/1984 | Hettinger, Jr. | 208/120 |
| 4,459,366 | 7/1984 | Mark et al. | 502/25 |
| 4,495,064 | 1/1985 | Boston | 208/120 |
| 4,496,665 | 1/1985 | Hettinger, Jr. et al. | 502/521 |
| 4,504,381 | 3/1985 | Bertsch | 208/113 |
| 4,507,398 | 3/1985 | Boston | 502/62 |
| 4,522,704 | 6/1985 | Bertsch | 208/113 |
| 4,535,066 | 8/1985 | Mark et al. | 502/62 |
| 4,576,709 | 3/1986 | Miller et al. | 208/57 |
| 4,601,815 | 7/1986 | Forester et al. | 280/120 |
| 4,624,418 | 11/1986 | Szkaradek | 241/46.17 |
| 4,627,959 | 12/1986 | Gilman et al. | 419/61 |
| 4,647,304 | 3/1987 | Petkovic-Luton et al. | 75/0.5 R |
| 4,651,935 | 3/1987 | Samosky et al. | 241/65 |
| 4,666,584 | 5/1987 | Luckenbach et al. | 208/113 |
| 4,676,439 | 6/1987 | Saito et al. | 241/172 |
| 4,680,204 | 7/1987 | Das et al. | 427/407.1 |
| 4,690,970 | 9/1987 | Feinauer et al. | 524/504 |
| 4,727,053 | 2/1988 | Bertus et al. | 502/521 |
| 4,746,459 | 5/1988 | Kaplan | 252/313.1 |
| 4,770,765 | 9/1988 | Bartek et al. | 208/113 |
| 4,776,937 | 10/1988 | Gupta et al. | 204/157.45 |
| 4,784,752 | 11/1988 | Ramamoorthy et al. | 208/251 R |
| 4,787,561 | 11/1988 | Kemp, Jr. et al. | 241/30 |
| 4,824,814 | 4/1989 | Elvin et al. | 502/22 |
| 4,830,730 | 5/1989 | Boston | 208/113 |
| 4,835,128 | 5/1989 | Child et al. | 502/21 |
| 4,844,355 | 7/1989 | Kemp, Jr. et al. | 241/172 |
| 4,889,617 | 12/1989 | English | 208/121 |
| 4,913,361 | 4/1990 | Reynolds | 241/259.2 |
| 4,913,801 | 4/1990 | Forester | 208/121 |
| 4,927,795 | 5/1990 | Tabler et al. | 502/33 |
| 4,929,583 | 5/1990 | Pasek et al. | 502/64 |
| 4,933,095 | 6/1990 | Johnson et al. | 252/1 |
| 4,935,121 | 6/1990 | Fu et al. | 208/120 |
| 4,954,244 | 9/1990 | Fu et al. | 208/120 |
| 4,966,331 | 10/1990 | Maier et al. | 241/172 |
| 4,971,935 | 11/1990 | Bartek et al. | 502/64 |
| 4,988,654 | 1/1991 | Kennedy et al. | 502/84 |
| 4,990,240 | 2/1991 | Pasek et al. | 208/120 |
| 5,019,241 | 5/1991 | Forester | 208/120 |
| 5,021,377 | 6/1991 | Maholland et al. | 502/26 |
| 5,033,682 | 7/1991 | Braun | 241/16 |
| 5,037,786 | 8/1991 | Cymbaluk | 502/64 |
| 5,064,524 | 11/1991 | Forester | 208/121 |
| 5,065,946 | 11/1991 | Nishida et al. | 241/16 |
| 5,075,206 | 12/1991 | Noda et al. | 430/531 |
| 5,083,712 | 1/1992 | Askew et al. | 241/16 |
| 5,112,388 | 5/1992 | Schulz et al. | 75/255 |
| 5,145,684 | 9/1992 | Liversidge et al. | 424/489 |
| 5,147,449 | 9/1992 | Grewe et al. | 75/354 |
| 5,171,484 | 12/1992 | Nishimura et al. | 252/62.9 |
| 5,188,995 | 2/1993 | Maholland et al. | 502/28 |
| 5,246,488 | 9/1993 | Tanaka et al. | 106/14.44 |
| 5,246,504 | 9/1993 | Ohta et al. | 136/201 |
| 5,260,240 | 11/1993 | Guthrie et al. | 502/41 |
| 5,270,076 | 12/1993 | Evers | 427/220 |
| 5,281,128 | 1/1994 | Dalla Betta et al. | 431/7 |
| 5,281,379 | 1/1994 | Noguchi et al. | 264/102 |
| 5,283,229 | 2/1994 | Narayaman et al. | 504/116 |
| 5,294,584 | 3/1994 | Yoshida et al. | 502/242 |
| 5,320,741 | 6/1994 | Johnson et al. | 208/49 |
| 5,338,712 | 8/1994 | MacMillan et al. | 501/94 |
| 5,350,437 | 9/1994 | Wantanabe et al. | 75/346 |
| 5,378,349 | 1/1995 | Senn | 208/121 |
| 5,389,233 | 2/1995 | Senn | 208/120 |
| 5,409,980 | 4/1995 | Myszak, Jr. | 524/409 |
| 5,704,556 | 1/1998 | McLaughlin | 241/21 |
| 5,786,077 | 7/1998 | McLaughlin | 428/331 |

STABLE DISPERSIONS OF METAL PASSIVATION AGENTS AND METHODS FOR MAKING THEM

This application is related to application Ser. No. 08/483,032 filed Jun. 7, 1995, now abandoned.

FIELD OF THE INVENTION

The present invention relates to stable dispersions of finely divided particles of metals and metal compounds that provide metal passivation properties to zeolite containing cracking catalysts. The present invention also relates to various milling processes to reduce such metals and metal compounds in size and disperse them in water and/or organic liquids.

BACKGROUND OF THE INVENTION

High boiling components of crude oil are unsuitable for inclusion in gasoline and other liquid hydrocarbon fuels. Accordingly, the petroleum refining industry has developed processes for cracking or breaking these high molecular weight, high boiling components into smaller, lower boiling molecules. One cracking process widely used for this purpose is known as fluid catalytic cracking (FCC). The FCC process has reached a highly advanced state, and many variations have been developed, but the unifying characteristic of these variations is that a vaporized hydrocarbon feedstock is cracked by contacting it at an elevated temperature with a cracking catalyst. Upon attainment of the desired degree of molecular weight and boiling point reduction, the catalyst is separated from the desired products.

If the catalyst is reused again and again for processing additional feedstock, which is usually the case, coke and heavy metals deposit onto the catalyst.

The spent catalyst is typically regenerated by contacting it with an oxygen-containing gas under conditions whereby at least a portion of the coke is converted to carbon oxides, and the regenerated catalyst is recycled to the reactor for contact with fresh feed.

As to the heavy metals that accumulate on the catalyst, they eventually accumulate to the point that they unfavorably alter the composition of the catalyst and/or the nature of its effect upon the feedstock. For example, such metals cause an increased formation of coke and hydrogen gas, thereby decreasing the yield of the desired gasoline. In addition, these metals affect both the activity and selectivity of the cracking catalyst. Regeneration does not solve the problems caused by these contaminating metals. Heavy metals capable of adversely affecting the catalytic cracking process include platinum, palladium, chromium, nickel, copper, cobalt, vanadium, and iron. Unfortunately, nickel, copper, vanadium, cobalt, and iron are often present as contaminants in the hydrocarbon feedstocks which are catalytically cracked.

Additional information regarding catalytic cracking of hydrocarbons and its challenges can be found, for example, in U.S. Pat. Nos. 4,454,025 and 4,363,720, which are incorporated by reference.

The ability of various metals and metal compounds to act as metal passivation agents against the adverse effects of transition elements such as nickel, vanadium, cobalt, copper, iron and other heavy metal contaminants on zeolite containing cracking catalysts is known in the art. Such passivating agents are used to enhance or restore metal contaminated, zeolite cracking catalysts. The treatment of the zeolite cracking catalysts with such metal passivation agents provides numerous benefits in catalytic cracking, including higher oil feed conversion, higher gasoline yield, higher isobutylene yield, lower yield of undesirable heavy cycle oil, lower coke generation and/or lower hydrogen gas generation.

Commercially used metal passivation agents come in many forms, including solutions of organometallic complexes and aqueous suspensions of colloidal solid particles in a suspending agent. In aqueous suspensions, the solid particles are typically prepared by chemical precipitation or by ion exchange chemistry. See, for example, U.S. Pat. No. 4,933,095 to Johnson et al., the disclosure of which is incorporated by reference. These passivation agents are used by directly introducing them at a carefully controlled rate into the hydrocarbon catalytic cracking unit, which typically includes a cracking reactor and a catalyst regenerator. For example, they can be introduced into the catalytic cracker, into the hydrocarbon feedstream, or into the regeneration zone. Successful introduction requires that the dispersion of passivating agents be stable and that a reasonable viscosity be maintained.

However, the above passivating agents are often expensive to prepare and the preparation routes are often restricted in the passivating agents that can be made available. In addition, more conventionally available and lower cost solid metals and metal compounds having potential use as effective metal passivation agents are too large to be conveniently suspended to form stable suspensions. Finally, the suspension agents currently used in connection with particulate passivating agents tend to act by thickening the suspension and hence slowing the rate at which the particles settle out of suspension. The use of such suspending agents results in suspensions that have a relatively short shelf life and/or are viscous, making them more difficult and costly to pump.

In view of the above, there is presently a need for a process by which a wide variety of particulate metals and metal compounds useful as metal passivating agents can be provided in a stabilized form that is convenient for introduction into the catalytic cracking process.

SUMMARY OF THE INVENTION

According to an embodiment of the present invention, a process for passivating contaminating metal on a hydrocarbon cracking catalyst is provided. The catalyst is contacted within a hydrocarbon catalytic cracking unit with a stabilized dispersion. The dispersion comprises a fluid vehicle, a dispersion agent, and finely milled particles of one or more metals or metal compounds for passivation of metal contaminated cracking catalysts. The particles have a volumetric average particle size of less than 0.5 micron, preferably less than 0.25 micron, more preferably less than 0.1 micron. As to the size distribution of the particles, it is preferred that at least 99% of the particles have sizes less than 1 micron, more preferably less than 0.3 micron.

The metal or metal compound is preferably selected from the group consisting of antimony, zirconium, tungsten, tin, bismuth, indium, thallium, calcium, tellurium, zinc, cadmium, lithium, germanium, beryllium, magnesium, strontium, aluminum, and compounds thereof. More preferably, the metal or metal compound is selected from antimony oxides, bismuth oxides, tin oxides, tungsten oxides and zirconium carbonates, most preferably antimony trioxide. The fluid vehicle is preferably selected from the group consisting of hydrocarbon oils, alcohols, ethylene glycol and water. The dispersion agent is preferably selected from the group consisting of cationic surfactants, amphoteric surfactants, non-ionic surfactants, wetting agents and anionic surfactants. If desired, the dispersion can be further provided with an antifreeze preferably selected from the group consisting of ethylene glycol, methanol, ethanol, isopropanol, and acetone.

The dispersion is preferably produced by a process wherein an agitated media mill is loaded with comminuting media, fluid vehicle, dispersing agent and particles of a metal or metal compound for passivation of metal-contaminated cracking catalyst. The comminuting media, fluid vehicle, and particles are then agitated until the particles are reduced in size by at least 10% and have a volumetric average particle size of less than 0.5 microns. At least 99% of the particles are preferably sized less than 1 micron.

In the above process the agitated media mill is preferably operated at a tip speed ranging from 1000 to 6000 feet per minute. The comminuting media are preferably provided in an amount sufficient to fill about 80 to 92% of the bulk volume within the mill. The comminuting media are preferably selected from the group consisting of sand, glass beads, metals and ceramics, more preferably barium titanate, leaded soda lime, borosilicate, carbon steel, stainless steel, tungsten carbide, zirconium silicate, alumina and yttrium stabilized zirconium oxide.

Accordingly, the present invention provides a cost efficient method of preparing stable aqueous and/or organic dispersions of metal passivation agents, with or without antifreeze agents, by size reduction of the solid particles by mechanical means in an appropriate dispersion agent.

One advantage of the present invention is that dispersions containing a wide variety of particulate passivating agents can be formed.

Another advantage of the present invention is that dispersions can be formed by a less costly and less complex process than many conventional methods.

An additional advantage of the present invention is that stable dispersions of metal passivating agents are formed without the use of suspending agents that function using increased viscosity to slow particulate settlement. The dispersions of the present invention therefore tend to be less viscous and have a longer shelf life than many suspensions of the prior art.

Yet another advantage of the present invention is that the dispersion of the present invention can be easily and precisely metered when added to a hydrocarbon catalytic cracking unit.

The above and other embodiments and advantages of the present invention will become apparent upon review of the detailed description, examples and claims to follow.

DETAILED DESCRIPTION

Wet media milling is the preferred process for making the passivating agent dispersions of the present invention. Metal passivating agents can be wet milled to levels that are not achievable with dry milling techniques.

In general, the ultimate characteristics of material comminuted in a wet media mill, particularly the particle size, is determined by several processing variables.

For example, the type of mill can affect the ultimate characteristics of the comminuted materials. The mill type can also determine how quickly a particular result may be achieved.

Other factors also determine the ultimate characteristics of the comminuted material, as well as the time and energy it takes to achieve them. Such factors include the following:

(1) In wet media milling, smaller media are more efficient in producing finer particles within times of 10 minutes and less.

(2) More dense media and higher tip speeds are desired to impart more energy to the particles being comminuted.

(3) Lower fluid viscosities are beneficial in comminuting particles.

(4) As the particles are reduced in diameter, exposed surface areas increase, and a dispersion agent is used to keep small particles from agglomerating.

As used herein "particle size" refers to a volumetric average particle size as measured by conventional particle size measuring techniques such as sedimentation, photon correlation spectroscopy, field flow fractionation, disk centrifugation, transmission electron microscopy, and dynamic light scattering.

A dynamic light scattering device such as a Horiba LA-900 Laser Scattering particle size analyzer (Horiba Instruments, Irvine, Calif.) is preferred by the present inventors, because it has advantages of easy sample preparation and speed. The volumetric distribution of the sample relates to the weight distribution.

Milling Equipment

The milling equipment preferred for the practice of the invention are generally known as wet agitated media mills in which comminuting media are agitated in a milling chamber.

The preferred method of agitation is by means of an agitator comprising a rotating shaft, such as those found in attritor mills. The shaft may be provided with disks, arms, pins, or other attachments. The portion of the attachment that is radially the most remote from the shaft is referred to herein as the "tip". The mills may be batch or continuous, vertical or horizontal. A ball mill is an example of a rudimentary agitated media mill.

A horizontal continuous media mill equipped with an internal screen having hole sizes that are ½ to ⅓ the media diameter is preferred as an efficient media mill for the practice of the present invention. High loadings of media are possible (e.g., loadings of 92%).

An increase in the amount of comminuting media in the chamber will increase comminuting efficiency by decreasing the distances between individual comminuting media particles and increasing the number of surfaces available to shear the material to be comminuted. The volume of comminuting media can be increased until the comminuting media constitutes up to about 92% of the mill chamber bulk volume (dead space between particles is excluded). At levels substantially above this point, the media locks up.

Starting Materials

By the present invention colloidal dispersions of passivating agents, including antimony, zirconium, tungsten, tin, bismuth, indium, thallium, calcium, tellurium, zinc, cadmium, lithium, germanium, beryllium, magnesium, strontium, aluminum and mixtures of two or more of the above metals or their compounds, are produced.

The particular metal or metal compound used is not critical, so long as such metals or metal compounds are insoluble in the dispersing medium and so long as they can be comminuted according to the techniques described herein. Friable solids are most preferred. Hence, a wide variety of compounds can be used for the practice of the present invention, including metal oxides, carbonates, orthophosphates, sulfides, halides, hydrides, hydroxides, selenides, antimonides, nitrides, and sulfates. Most preferred compounds are inexpensive, readily available compounds such as oxides, hydroxides and carbonates.

Within reason, the size of the feed material to be comminuted is not critical, for example, antimony trioxide can be reduced to approximately a 0.10 micron average particle size with an agitated media mill using the process of the present invention, whether starting from particles that have an average particle size of 4 microns, 2 microns or 0.6 micron. However, the feed material preferably should not be more than 10% of the size of the comminuting media. Other metal passivating agents can be similarly reduced to an average particle size of 0.25 microns or less in short comminuting times.

Generally, in accordance with the present invention, the average particle size of the milled passivating agents is no greater than 0.5 micron, more preferably 0.25 micron, and most preferably 0.1 micron. Preferably, at least 99% of the milled passivating agent particles have sizes less than 1 micron, and more preferably, 0.3 micron.

Faster milling times can be achieved, if smaller starting materials are used. Thus, it is preferable to start with particles that are as small as is economically feasible, to reduce milling time. For example, 0.6 micron antimony trioxide feed material (as measured by Transmission Electron Microscopy) can be comminuted to a desired size (e.g., 0.1 micron) in a shorter time than can a 4 micron material. For this reason, antimony trioxide having a 0.6 micron average particle size is preferred to material having a larger particle size. When such material is used, a tight particle distribution can be achieved, as well as a short milling time.

Comminuting Media

Acceptable comminuting media for the practice of the present invention include sand, glass beads, metals, and ceramics. Preferred glass beads include barium titanite (leaded), soda lime (unleaded), and borosilicate. Preferred metals include carbon steel, stainless steel and tungsten carbide. Preferred ceramics include yttrium stabilized zirconium oxide, zirconium silicate, and alumina. The most preferred comminuting media for the purpose of the invention is yttrium stabilized zirconium oxide.

Each type of media has its own advantages. For example, metals have high specific gravities, which increase comminuting efficiency due to increased impact. Metal costs range from low to high, and contamination may be an issue. Glasses are advantageous from the standpoint of low cost and the availability of small sizes as low as 0.004 mm. Such small sizes make possible a finer ultimate particle size. The specific gravity of glasses, however, is lower than other media and more milling time is required. Finally, ceramics are advantageous from the standpoint of low wear, low porosity and ease of cleaning.

The comminuting media used for particle size reduction are preferably spherical. As noted previously, smaller comminuting media sizes result in smaller ultimate particle sizes. The comminuting media for the practice of the present invention preferably have an average size ranging from 0.004 to 1.2 mm, more preferably 0.012 to 0.2 mm. By using properly selected comminuting media, the milling process of the present invention actually communities particles, rather than deagglomerating clumps of particles—a task for which media mills are normally used.

Fluid Vehicles

Fluid vehicles in which the particles may be comminuted and dispersed include water, and organic liquids such as hydrocarbon oils, alcohols, and ethylene glycol. In general, as long as the fluid vehicle used has a reasonable viscosity and does not adversely effect the chemical or physical characteristics of the particles, the choice of fluid is optional. Water is ordinarily preferred.

On occasions, aqueous suspensions also have to withstand ambient temperatures below 0° C., so an antifreeze should be introduced into the suspension if required. Preferred antifreezes include ethylene glycol, methanol, ethanol, isopropanol, acetone and mixtures thereof. Ethylene glycol is most preferred.

Dispersion Agents

Dispersion agents preferably act to wet newly exposed surfaces that result when particles are broken open. Dispersion agents also preferably stabilize the resulting slurry of milled particles by providing either (1) a positive or negative electric charge on the milled particles or (2) steric blocking through the use of a large bulking molecule. An electric charge is preferably introduced by means of anionic and cationic surfactants, while steric blocking is preferably performed by absorbed polymers with charges on the particle which repel each other. Zwitterionic surfactants can have both anionic and cationic surfactant characteristics on the same molecule.

Preferred dispersion agents for the practice of the invention include wetting agents (such as TRITON X-100 and TRITON CF-10, sold by Union Carbide, Danbury Conn., and NEODOL 91-6, sold by Shell Chemical) and anionic surfactants (such as TAMOL 731, TAMOL 931, TAMOL 165A and TAMOL-SN sold by Rohm and Haas, Philadelphia, Pa., COLLOID 22/35, sold by Rhone Poulenc, Philadelphia, Pa., and SURFYNOL CT-131 made by Air Products in Allentown, Pa.). Other anionic surfactants include salts of acrylic acid copolymers such as BYK-156 from Byk Chemie, Wellingford Conn. or DURAMAX-3007 from Rohm and Haas.

Also preferred are cationic dispersants (such as DISPER-BYKE 182 sold by Byke Chemie); amphoteric surfactants (such as CROSULTAIN T-30 and INCROSOFT T-90, sold by Croda, Inc., Parsippany, N.J.); and nonionic surfactants (such as DISPERSE-AYD W-22 sold by Daniel Products Co., Jersey City, N.J., BRIJ-30 sold by ICI in Wilmington, Del., and SURFYNOL CT-111 sold by Air Products).

For non aqueous systems, preferred dispersants include phosphoric esters of ethylene oxide adducts (such as PHOSPHAC D6N made by Synthron Inc. of Morgantown, N.C.).

Most preferred dispersion agents are anionic surfactants such as TAMOL-SN which can act both as a milling aid and as a dispersant in aqueous systems.

Other Milling Parameters

The relative proportions of particles to be comminuted, fluid vehicles, comminuting media and dispersion agents may be optimized for the practice of the present invention.

Preferably, the final slurry exiting the mill comprises the following: (1) 10 to 60 wt %, more preferably 15 to 45 wt %, most preferably about 40 wt % of the particle to be comminuted; (2) 1 to 8 wt %, more preferably 2 to 6 wt %, most preferably about 4 wt % of the dispersion agent; and (3) the balance of the fluid vehicle.

Preferably the comminuting media loading as a percent of the mill chamber volume is 80 to 92%, more preferably 85 to 90%.

The agitator speed controls the amount of energy that is put into the mill. The higher the agitator speed, the more kinetic energy is put into the mill. Higher kinetic energy results in greater comminuting efficiency, due to higher shear and impact. Thus, an increase in agitator RPM results in an increase in comminuting efficiency. Although generally desirable, it is understood by those skilled in the art that an increase in comminuting efficiency will be accompanied by a concurrent increase in chamber temperature and wear rate.

The tip speed of the agitator represents the maximum velocity (and, thus, kinetic energy) experienced by the particles to be milled. Thus, larger diameter mills can impart media velocities equal to those of smaller mills at a lower RPM.

Residence time (referred to cumulatively as retention time) is the amount of time that the material spends in the comminuting chamber while being exposed to the comminuting media. Residence time is calculated by simply determining the comminuting volume that is available for the mill and dividing this figure by the rate of flow through the mill (throughput rate). In general, a certain residence time will be required to achieve the ultimate product characteristics desired (e.g., final product size). If this residence time can be reduced, a higher throughput rate can be achieved, minimizing capital costs. For the practice of the present invention, the residence time can vary, but is preferably less than 15 minutes, and more preferably less than 10 minutes.

It is often desirable to stage two or more mills in series, particularly when dramatic reductions in particle size are necessary to optimize comminution efficiency. Maximum particle size reduction within a given milling step typically ranges from about 10:1 to as high as about 40:1 and is to some extent dependent upon media size. As a result, the number of milling steps increases as the overall size reduction requirement increases. Effects similar to that of staged mills can also be achieved using a single mill by collecting the output and repeatedly feeding the output through the mill. However, residence time may be longer to achieve similar ultimate particle size.

Method of Addition

The dispersions of the present invention are added to the hydrocarbon catalytic cracking unit in a rate-controlled manner, preferably by adding the dispersion into the cracking reactor, either to the hydrocarbon feed stream or in a separately introduced stream into the cracking reactor, or by introducing the dispersion into the catalyst regenerator. As noted above, the dispersions of the present invention are advantageous for this purpose, since they are stable, easily and precisely metered, possess low viscosity, and they are inexpensive relative to other commercially available passivity agents such as organometallic complexes.

EXAMPLES

The following examples, as well as the foregoing description of the invention and its various embodiments, are not intended to be limiting of the invention but rather are illustrative thereof. Those skilled in the art can formulate further embodiments encompassed within the scope of the present invention.

Example 1

A 10 liter horizontal continuous media mill (Netzsch, Inc., Exton, Pa.) was 90% filled with YTZ (yttrium stabilized zirconium oxide) media with an average diameter of 0.2 mm and a specific gravity of 5.95 (Tosoh Corp., Bound Brook, N.J.). A 0.1 mm screen was installed inside the mill at the outlet. Forty-five pounds of antimony trioxide with an average starting particle size of 2.0 microns (Anzon, Inc., A Cookson Group Company, Philadelphia, Pa.) were slurried in 55 pounds of water and 4.5 pounds of TAMOL-SN.

The mill was operated at a tip speed that averaged 2856 feet per minute. After 7.5 minutes of retention time (5 passes through the mill) the average particle size, by volume, was reduced to 0.102 micron and 99.9% of the particles had sizes less than 0.345 micron when measured on a Horiba A 900 particle size analyzer.

The material produced in the media mill showed no signs of settlement overnight. Even after a month of settlement, only a very thin clear layer appeared on top. The dispersion appeared to be a uniform gel, which flowed easily by applying minimum shear.

Example 2

The same mill, media and loading as in Example 1 were used. This time, antimony trioxide feed having a 0.6 micron particle size (Anzon, Inc.) was used. Thirty pounds of the antimony trioxide were slurried with 70 pounds of water and 1.8 pounds of TAMOL-SN and 0.9 pounds of Triton CF-10.

The tip speed during the run averaged 2878 feet per minute. After 4.8 minutes of retention time in the mill (4 passes), the volume average particle size was 0.11 micron and 99.9% of the particles had sizes less than 0.31 micron.

Example 3

The same mill, media, and loading as in Example 1 were used. Thirty pounds of 4 micron antimony trioxide feed material (Anzon, Inc.) were slurried with 70 pounds of water and 2.8 pounds of TAMOL-SN. Tip speed was 2860 feet per minute. After 7 minutes of retention time (5 passes), the average particle size was 0.10 micron with 99.9% of the particles having sizes less than 1.2 micron.

Example 4

The same mill, media, and loading as in Example 1 were used. This time zirconium carbonate (MEI, Flemington, N.J.) with an average particle size of 25 microns was used. Twenty lbs of Zirconium Carbonate were slurried with 25 lbs of water and 2 lbs of TAMOL-SN. After 80 minutes in recirculation mode (24 turnovers of the feed tank) the average particle size was 0.112 micron and 99.9% of the particles were below 0.301 micron. The tip speed averaged 2820 feet per minute.

Example 5

A 0.5 liter horizontal continuous media mill (Netzsch) was 90% filled with YTZ (yttria stabilized zirconium oxide) media with an average diameter of 0.22 mm and a specific gravity of 5.95 (Tosoh Corp., Bound Brook, N.J.). A 0.1 mm screen was installed at the outlet. 500 g of tungsten trioxide (Aldrich Chem. Co., Gillingham, U.K.) With an average starting particle size of 4.1 microns were slurried with 1000 g of water and 5 g of Duramax D3007 dispersant. The mill was operated at a tip speed that averaged 1803 feet per minute. After 10 passes through the mill, the slurry was then recirculated at a pump speed of 1.44 liters per minute. After 32 minutes of recirculation, the average particle size was 0.09 micron, with 99.9% of the particles having sizes less than 0.2 micron.

Example 6

The same mill, media, and loading as in Example 5 were used. 500 g of bismuth oxide (Aldrich Chem. Co., Gillingham, U.K.) with an average starting particle size of 16.1 microns were slurried with 1000 g of water and 5 g of Duramax D3007 dispersant (Rohm and Haas, Philadelphia Pa.). The mill was operated at a tip speed that averaged 1803 feet per minute. After one pass through the mill, the average particle size was 0.103 micron, with 99.9% of the particles having sizes less than 0.315 micron.

Example 7

The same mill, media, and loading as in Example 5 were used. 1000 g of indium trioxide (Arconium, Providence, R.I.) with an average starting particle size of 2.1 microns was slurried with 1000 g of water and 10 g of Darvan C dispersant. The pH was adjusted to 9 to assist dispersion. The mill was operated at a tip speed that averaged 1803 feet per minute. After 5 passes through the mill, the slurry was then recirculated through the mill at a pump speed of 1.44 liters per minute. After 45 minutes of recirculation, the average particle size was 0.2 micron, with 99.9% of the particles having sizes less than 0.4 micron.

Example 8

The same mill, media, and loading as in Example 5 were used. 500 g of tin dioxide (Aldrich Chem. Co., Gillingham, U.K.) With an average starting particle size of 2.6 microns were slurried with 1000 g of water and 5 g of Duramax D3007 dispersant. The mill was operated at a tip speed that averaged 1803 feet per minute. After 5 passes through the mill, the slurry was then recirculated through the mill at a pump speed of 1.44 liters per minute. After 1 hour and 6 minutes of recirculation, the average particle size was 0.098 micron, with 99.9% of the particles having sizes less than 0.210 micron.

Example 9

The same mill, media, and loading as in Example 5 were used. 500 g of zinc orthophosphate (BDH) with an average starting particle size of 25.5 microns were slurried with 1300 g of water and 5 g of Duramax D3007 dispersant. The mill was operated at a tip speed that averaged 1803 feet per minute. After 5 passes through the mill, the slurry was then recirculated through the mill at a pump speed of 1.44 liters per minute. After 1 hour of recirculation, the average particle size was 0.1 micron, with 99.9% of the particles having sizes less than 0.236 micron.

Example 10 (Comparative)

This time a Kady Model OB-20 Dispersion Mill (Kady International, Scarborough, Me.) operating at a tip speed of 9000 feet per minute was used to disperse and deagglomerate an antimony trioxide feed material of 1.34 micron starting average particle size with 99.9% of the particles having sizes less than 4.68 microns.

As in Example 1, 4.5 pounds of TAMOL-SN dispersant, 45 lbs of antimony trioxide and 55 lbs of water were loaded into the mill. The particle distribution was monitored versus time. After 20 minutes of mixing, the average particle size was 0.988 micron. After 160 minutes the average particle was 1.048 micron. It is believed that some deagglomeration occurred at the beginning of the run. In contrast to wet media milling with appropriate media, even after 160 minutes, no fine particles were present below 0.2 micron. By the next day the solids had settled about 25% from the surface, leaving a clear layer on top. After a week, the solids had settled more than 50%.

Example 11 (Comparative)

The Kady Dispersion Mill of Example 10 was operated at a tip speed of 9000 feet per minute to dispense and deagglomerate an antimony trioxide feed material with an average particle size of 0.750 micron with 99.9% of the particles having sizes less than 3.95 microns. The amounts of antimony trioxide, TAMOL-SN and water were the same as those of Example 1.

Again, particle size was monitored versus time. After 45 minutes the average particle was 0.784 micron with 99.9% of the particles having sizes less than 3.024 microns. In contrast to wet media milling with appropriate media, even after 60 minutes, no fines were present below 0.2 micron. The dispersion was not stable and overnight the antimony trioxide solids had settled about a third, leaving a clear water layer on top.

Based on a comparison of Example 1 with Examples 10 and 11, it is seen that, using wet media milling (in which particles are broken down to average particle sizes of less than 0.11 micron), superior stable dispersions can be produced by the formation of such fine particles.

What is claimed is:

1. A process for passivating contaminating metal on a hydrocarbon cracking catalyst which comprises contacting said catalyst within a hydrocarbon catalytic cracking unit with a stable dispersion, said dispersion comprising a fluid vehicle, a dispersion agent, and finely milled particles of one or more metal or metal compound for passivation of metal contaminated cracking catalyst within a hydrocarbon catalytic cracking unit, said particles having a volumetric average particle size of less than 0.1 micron and at least 99% of said particles having sizes less than 1 micron.

2. The process of claim 1, wherein at least 99% of said particles have sizes less than 0.3 micron.

3. The process of claim 1, wherein said metal or metal compound is selected from the group consisting of antimony, zirconium, tungsten, tin, bismuth, indium, thallium, calcium, tellurium, zinc, cadmium, lithium, germanium, beryllium, magnesium, strontium, aluminum, and compounds thereof.

4. The process of claim 3, wherein said metal or metal compound is selected from antimony oxides, bismuth oxides, tin oxides, tungsten oxides and zirconium carbonates.

5. The process of claim 4, wherein said metal or metal compound is antimony trioxide.

6. The process of claim 1, wherein said fluid vehicle is selected from the group consisting of hydrocarbon oils and ethylene glycol.

7. The process of claim 1, wherein said fluid vehicle is water.

8. The process of claim 1, wherein said dispersion agent is selected from the group consisting of cationic surfactants, amphoteric surfactants, and non-ionic surfactants.

9. The process of claim 1, wherein said fluid vehicle is an alcohol.

10. The process of claim 1, wherein said metal or metal compound is antimony trioxide.

11. The process of claim 10, wherein at least 99% of said particles have sizes less than 0.3 micron.

12. The process of claim 10, wherein said fluid vehicle is selected from the group consisting of hydrocarbon oils and ethylene glycol.

13. The process of claim 10, wherein said fluid vehicle is water.

14. The process of claim 10, wherein said dispersion agent is selected from the group consisting of cationic surfactants, amphoteric surfactants, and non-ionic surfactants.

15. The process of claim 10, wherein said fluid vehicle is an alcohol.

16. The process of claim 11, wherein said metal or metal compound is not antimony trioxide.

17. The process of claim 16, wherein said metal or metal compound is selected from the group consisting of antimony, zirconium, tungsten, tin, bismuth, indium, thallium, calcium, tellurium, zinc, cadmium, lithium, germanium, beryllium, magnesium, strontium, aluminum, and compounds thereof.

18. The process of claim 17, wherein said metal or metal compound is selected from antimony oxides, bismuth oxides, tin oxides, tungsten oxides and zirconium carbonates.

19. The process of claim 16, wherein at least 99% of said particles have sizes less than 0.3 micron.

20. The process of claim 16, wherein said fluid vehicle is selected from the group consisting of hydrocarbon oils and ethylene glycol.

21. The process of claim 16, wherein said fluid vehicle is water.

22. The process of claim 16, wherein said dispersion agent is selected from the group consisting of cationic surfactants, amphoteric surfactants, and non-ionic surfactants.

23. The process of claim 16, wherein said fluid vehicle is an alcohol.

* * * * *

UNITED STATES PATENT AND TRADEMARK OFFICE
CERTIFICATE OF CORRECTION

PATENT NO. : 5,935,890
DATED : August 10, 1999
INVENTOR(S) : John McLAUGHLIN et al.

It is certified that error appears in the above-identified patent and that said Letters Patent is hereby corrected as shown below:

| Column | Line | |
|--------|------|---|
| 11 | 9 | Change "claim 11" to --claim 1--. |

Signed and Sealed this

Eighth Day of August, 2000

Attest:

Q. TODD DICKINSON

Attesting Officer

Director of Patents and Trademarks